United States Patent [19]
Plowman et al.

[11] 3,936,541
[45] Feb. 3, 1976

[54] SURFACE DECORATION OF EMBOSSED OR TEXTURED PANEL PRODUCTS

[75] Inventors: Larry M. Plowman, Royal Oak; Thomas G. Lahaye, Holland, both of Mich.

[73] Assignee: Abitibi Corporation, Troy, Mich.

[22] Filed: Dec. 26, 1973

[21] Appl. No.: 427,708

[52] U.S. Cl. ................ 427/262; 29/110; 118/122; 427/264; 427/267; 427/274; 427/280; 427/345; 428/156; 428/195; 428/211
[51] Int. Cl.² .......................................... B05D 5/00
[58] Field of Search.... 117/8, 10, 11, 102 R, 102 L; 118/109, 112, 114, 118, 121, 122; 29/110, 132; 427/262, 264, 271, 274, 280, 345; 428/156, 195, 211

[56] References Cited
UNITED STATES PATENTS

| | | | |
|---|---|---|---|
| 1,601,491 | 9/1926 | Bergman | 117/10 |
| 1,607,540 | 11/1926 | Jonsson | 117/10 |
| 1,756,373 | 4/1930 | Mckercher | 117/102 |
| 3,081,159 | 3/1963 | Brown | 427/274 |
| 3,247,047 | 4/1966 | Buckley | 427/280 |
| 3,350,217 | 10/1967 | Goff | 117/102 L |
| 3,448,720 | 6/1969 | Graham | 118/109 |
| 3,576,711 | 4/1971 | Baldwin | 161/169 |
| 3,736,901 | 6/1973 | Aspenson | 118/109 |
| 3,776,752 | 12/1973 | Craven | 427/274 |

Primary Examiner—Harold Ansher
Assistant Examiner—Stanley S. Silverman
Attorney, Agent, or Firm—Stevens, Davis, Miller & Mosher

[57] ABSTRACT

This relates to a method of decorating a panel having a multi-level pattern of ridges and recesses on a major surface thereof. This patterned major surface is coated with a liquid pigmented material and is thereafter rollingly contacted under pressure with a roll having a resilient surface. The resilient roll picks up liquid pigmented material from the higher portions of the pattern while at the same time the pigmented material which has been picked up from the panel surface is continually removed or cleaned from the roll surface. Thereafter, the pigmented material which remains on the panel surface is at least partially dried or cured. In the preferred form of the invention the panel surface has a layer of paper integrally combined therewith, the paper having a printed surface thereon which complements the multi-level surface pattern of the panel. The degree of pressure between the roll surface and the panel is such as to provide for a pick-up of sufficient of the pigmented material from the higher portions of the multi-level pattern as to expose the printed paper surface at the higher portions to view. A clear protective top coat is applied to the product. In the final product, relatively large amounts of pigment remain in the deeper valleys or recesses while little or no pigment is located on the higher ridges. Between these two extremes varying amounts of pigment remain. Thus, the embossed pattern stands out clearly and the apparent depth of pattern is relatively great. Furthermore, the underlying printed surface of the paper shows through at the higher ridges and thus the final product exhibits color variations on the higher ridges which in combination with the varying amounts of accent pigments on the lower surface portions provides a pleasing overall visual effect.

8 Claims, 8 Drawing Figures

FIG. I.

SURFACE DECORATION OF EMBOSSED OR TEXTURED PANEL PRODUCTS

This invention relates to the decorating or finishing of a multilevel product surface, for example, an embossed or textured surface, by providing a color contrast between the high and low areas or regions of the surface.

The most common prior art procedure used extensively for surface accent coloring of multilevel surfaced products is reverse roll coating (reverse roll wiping). In this method colored coating material is metered from a paint well to a rubber applicator roll and is then transferred onto the product surface. Sufficient coating is carried on the applicator roll to cover the entire board surface, with partial flow-down into the embossed, low lying areas. A steel wiping roll, which turns in a direction opposed to the panel travel, simultaneously removes coating material from the uppermost surface of the product and floods the embossed areas with excess coating. The coating material that is removed from the product is constantly doctored from the steel roll. This excess material is transferred to the applicator roll, and finally is returned to the coating well for re-use.

Reverse roll wiping leaves much to be desired with products which display non-uniform product thicknesses across the width of the web, panel, or piece to be finished. When product thickness varies, the inflexible steel wiping roll will leave an excess of colorant on the low surface areas of the product in a manner undesirable from an appearance, product quality, or process viewpoint. For example, fibreboard products formed by the common hot press methods both wet or dry fibre mat techniques exhibit a tendency (to varying uncontrollable degress) to have edges greater in thickness than the center of the panels due to unequal shrinkage in the hot press, and also show the typical fibreboard "cockle" or "hammer" pattern over the surface of the products. (This latter effect is believed due to individual wood fibres collecting into large clots in the pulp slurry, which results in non-uniform mat formation.)

When color accenting of this surface by the reverse flooding or reverse wiping method is attempted, an excess of accent material will be left by the non-deflecting steel wiping roll near the center of the panel where the board thickness is lowest, and at the low lying areas adjacent those regions having a "cockle" or "hammer" pattern on the surface. Thus it becomes difficult, if not impossible, to achieve the desired end effect of leaving accent color only in the embossed low areas of the product, and not on the surface, if the reverse wipe technique is employed.

A somewhat similar undesirable effect is seen with embossed plywood products as a result of poor caliper uniformity or low caliper areas associated with core voids. Again, the steel wiping roll method will leave an excess of color coating at the low caliper areas on the panel surface, thus interfering with product quality, increasing coating cost, and destroying the appearance of the final product.

The above problems are reduced somewhat, but not entirely eliminated, by exerting the maximum possible pressure of the reverse wiping roll on the product surface. However, this method for continuous production is not completely satisfactory in that equipment maintenance is dramatically increased due to the added strain placed on the machine, and more importantly, the severe wiping action of the steel roll tends to mark or score the product surface if it is sensitive to mechanical abrasion. An example of this is illustrated in multiple-coat products manufactured on high speed finishing lines. When the accent color is applied and wiped over a partially cured painted surface, the relatively tender and underlying coating system can be easily marked or completely removed by the scraping action of the reverse roll.

It is, therefore, desirable to provide a color accenting method which applies coating material uniformly over a major surface of the product combined with a process which consistently and gently removes the excess coating from the higher surfaces of the product, while leaving the accent color in the low-lying embossed areas.

This invention involves the steps of applying the coating or accent material to a major surface of the product by means such as a direct roll coater, or spray coater combined with means employing a roll having a resilient surface adapted to remove excess coating material from the upper areas of the panel product to provide a proper colour contrast and graduation without damage to the underlying surface.

Thus, in accordance with one aspect of the invention there is provided a process for producing a visible pattern on a panel which includes passing in a path of travel a panel having a surface pattern of pronounced ridges and walled recesses or valleys, the ridges and valleys having varying widths and the valleys extending to various depths below an imaginary datum surface defined by the tops of the highest ridges, and applying a liquid coating of a pigment or accent material over the entire surface. Thereafter, pressure contact is effected between the panel surface and a rotating resiliently deformable roll surface whereby said roll surface deforms under the influence of the contact pressures and contacts at least the higher ones of the ridges and effects removal of pigmented or accent material from the contacted portions of the panel surface. At the same time, the removed pigmented or accent material is continually removed from the surface of the rotating roll. Thereafter at least some drying or curing of the pigmented or accent material remaining on the panel is effected.

It is a further important feature that the above mentioned roll be made to rotate in the same direction as the moving panel with there being substantially no relative movement between the roll surface and the panel at the line of contact. Relative movement between roll and panel tends to displace the accent or pigmented material back into the grooves or valleys thus resulting in an excessive thickness of same at the bottom of these valleys which can give rise to blistering of this material during later curing or drying stages. Thus, to ensure optimum pick-up of accent material from those portions of the panel contacted by the roll there should be substantially no relative movement between the roll surface and the panel.

In a typical process, the panel will have a clear protective overlay coating applied thereto after completion of the above described steps. Curing or drying of the panel surface is then effected to provide a finished panel.

The invention is well suited to a variety of board products such as embossed fibre board and particle board, embossed plywoods and various other textured surfaces requiring decoration. The invention is particularly well suited to the decorating and finishing of embossed fibre boards of the type made by the process disclosed in U.S. Pat. No. 3,576,711 issued Apr. 27, 1971 to Stanley H. Baldwin, the disclosure of which patent is incorporated herein by reference. Basically, that patent discloses a process for producing hardboard having a simulated woodgrain surface which involves applying a printed pattern to a sheet of paper, applying such sheet to a partially dewatered mat with the printed surface facing outwardly, and pressing in a hot press to combine the sheet with the mat and emboss a pattern which is complementary to the printed pattern. The printed pattern is not in registry with the embossed pattern although the two are complementary to each other. This product has a greatly improved realism and apparent depth of pattern as compared with prior art process. However, the appearance of the above described product can be further greatly improved by further treating same in accordance with the principles of the present invention.

Thus, in accordance with a further aspect of the invention, a panel comprising a base, a sheet of paper integrally combined with a major surface of the base and a pattern printed on the exterior surface of such paper with contours complementary to but not in registration with the printed pattern embossed in the surface of such paper (such embossing extending into said major surface of the base) is treated as described above. That is, the embossed, printed paper side of the panel is coated with liquid pigmenting or accent material is thereafter contacted with the rotating resiliently deformable roll surface whereby the roll surface deforms under pressure and contacts the higher ridges and, depending upon roll hardness and pressure applied, upper portions of at least some of the side walls of the valleys and effects removal of the pigmenting or accent material therefrom with a graduation in pigment density between the highest surface areas and the lowest valley regions being provided. In the higher surface areas where the pigmentation has been fully or partially removed, the underlying printed paper can be seen. By selecting the colors of the printed paper and the patterns thereon in conjunction with the selection of the pigment, a very pleasing over-all visual effect can be achieved.

After the above, the pigment is dried or cured at last partially, and a clear protective top coat is applied and then is dried or cured to provide the finished product.

Further aspects of the invention will be apparent from the following description, by way of example, of a preferred embodiment of same, reference being had to drawings wherein:

FIG. 1 schematically illustrates the preparation of an embossed paper overlaid hardboard in accordance with the teachings of U.S. Pat. No. 3,576,711 issued Apr. 27, 1971;

FIG. 2 schematically illustrates the decorating of a multi-level panel surface in accordance with the invention;

FIG. 3 schematically illustrates apparatus for applying a liquid accenting or pigmenting material to the panel;

FIG. 4 schematically illustrates apparatus for removing or picking up pigmenting material from higher portions of the surface contacted;

Figure 1:
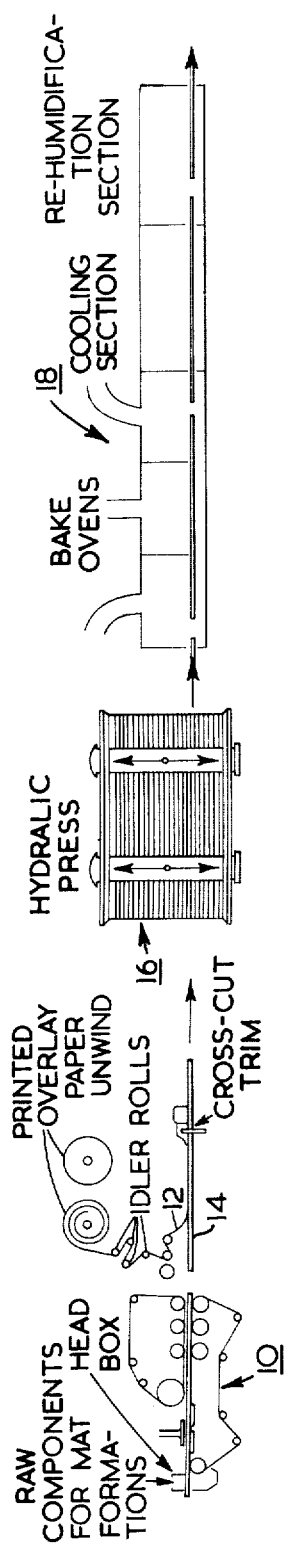

With reference to FIG. 1 a hardboard is formed in accordance with the process disclosed in the above mentioned Baldwin patent by defibrating wood chips and refining same in conventional fashion followed by forming and dewatering of the wet lap on a Fourdrinier machine 10. A sheet of paper 12 is applied to the lap or mat 14 when it has been dried to a consistency of about 25–40% solids by weight. The paper is printed on its exterior surface with a pattern such as a wood grain representation, e.g., a simulated Barnboard. The paper is preferably of a groundwood or newsprint type as set forth in the Baldwin patent. The combined base mat and paper overlay are then transferred to a hot press 16 having its caul plates which will be in contact with the paper surface shaped to provide an embossing of the surface with a pattern complementary to the printed pattern. When a wood grain effect is being achieved, the wood grain is made to extend longitudinally of the panel and, in order that the printed pattern may complement the embossed pattern, (they are not registered with one another) the alternating or blended hues or shades of pattern colouring on the paper which provide the wood grain representation also extend generally longitudinally of the panel. The depth of draw or embossing depth will depend on the countours of the printed pattern and also on the nature of the paper as explained in the above mentioned patent. As noted in the patent, embossing depths as great as 0.080 inches were achieved without paper breaks; embossing depths as great as 0.100 have since been achieved. After the pressing and embossing, the panels are baked in bake ovens 18 as described in the above patent cooled and rehumidified as known in the art and the embossed paper overlaid panels stored up for the next stage of the procedure. No protective coating is applied to the paper overlay surface at this time as the paper surface must be sufficiently absorbent as to ensure good retention of the pigment or accent material which is applied at a later stage of the process.

Figure 2:
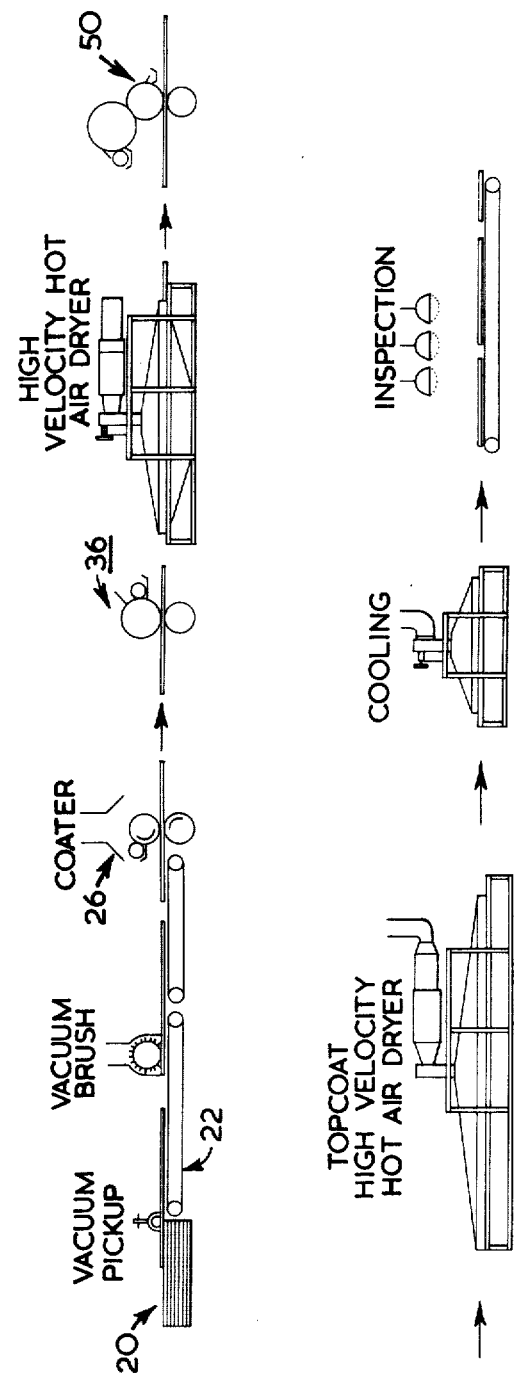
Figure 3:
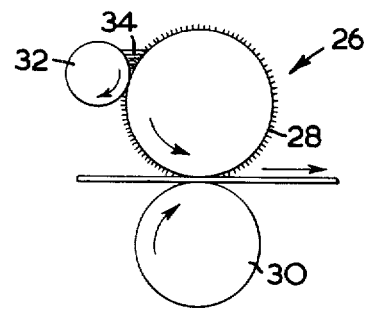

With reference to FIG. 2 of the drawings, the panels are then passed from a storage point 20 on to a moving conveyor 22 which passes the sheets beneath a conventional vacuum brush arrangement 24 to clear the top embossed paper overlaid surface of the panel from dust, debris etc. In the next stage, the panel is passed into the coating apparatus 26 which is shown more clearly in FIG. 3. The coater includes a soft pile fabric covered coating roll 28 which contacts the embossed paper overlaid surface and a back-up or support roll 30 in opposition thereto. A synthetic woven pile fabric having a pile height of about seven-sixteenths inch has been found to provide a very effective coating roll covering. A metering roll 32 contacts the pile surface of roll 28 and a pool 34 of pigmenting or accent coating is maintained in the nip formed between these rolls. Thus, as the rolls 28, 30, 32 rotate in the directions shown, a uniform coating of accent material is applied to the panel surface. The main object is to get a complete coating of material on the panel surface and to ensure that all valleys receive a coat of material. At the same time, it should be realized that other types of coaters, such as spray coaters, could be used here as well.

The accent material may be any one of a number of commercially available pigmenting agents, either solvent based or water based. The preferred accent materials comprise amine modified water base acrylic emulsions such as may be commercially obtained from Reliance Universal Inc. of Chicago, ILL. The level of pigmentation in the emulsion is preferably kept relatively low so that at thin film thicknesses the accent coat is transparent. If the level of pigmentation is too high it is more difficult to obtain a proper graduation or shading. By way of example only, a black accent coat of an amine modified water base acrylic emulsion had a 2.6% pigment solids content by weight while in a lighter reddish brown shade a 4.6% pigment solids by weight concentration gave good results. Any colour can be used, of course, depending upon the panel end shade desired.

Figure 4:
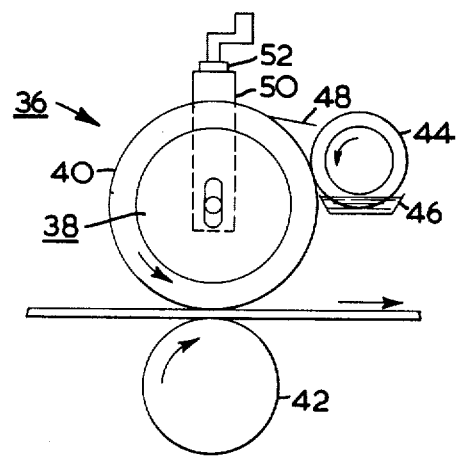

After the coating stage the panel is passed into apparatus 36 for "accenting" or removing some of the coating from the embossed surface of the panel (see FIG. 4). Apparatus 36 includes a smooth surfaced pick-up roll 38 having a resilient surface 40 which directly contact the coated embossed panel surface, and a back-up roll 42 which contacts the opposite or lower panel surface. In order to continually wash the pickup roll 38 clean, a washer roll 44 runs in contact with the surface of roll 38, both these rolls rotating in the same direction so that the relative motion between them ensures a good cleaning action. Washer roll 44 has a soft sponge surface to further enhance the washing action and runs with its lower portion immersed in a pan 46 of washing liquid which, in the case of water based accent materials, may be water. A suitable fresh water supply and removal systeem (not shown) is provided to avoid an undue concentration or build-up of pigment in pan 46. To further clean the surface of pick-up roll 38, a doctor blade 48 is provided after the washing roll 44 to continually wipe clean the surface of roll 38. Thus, during rotation, the pick-up roll 38 continually presents a clean surface to the coated panel surface thus assisting in assuring optimum pick-up In some cases a further "accenting" apparatus 36 can be provided which is positioned downstream of the first apparatus 36 whereby to provide for a pick-up of additional accent material from the panel surface.

A pressure applying means is provided to continually urge roll 38 towards the panel and the underlying back-up roll. This may consist of spring loading devices 50 attached to opposing ends of the axle on which roll 38 rotates, with screw and crank adjustment means 52 being provided to vary the degree of compression of the springs.

The pick-up roll has a non-absorbent resilient surface, as for example, Buna N rubber. Other similar materials could be used such as Neoprene, Nitrile, natural rubber etc, so long as the material used is chemically resistant to the accent coating used and is not subject to rapid wear as the result of abrasion. The accent material must also cling to the roll so, in the case of water based pigmenting materials, a hydrophilic roll surface is required. A "dual Durometer" roll could also be used, i.e., one having a softer core to accommodate overall caliper (panel thickness) variations and a somewhat harder surface in the case of designs where the embossing is very shallow. Roll hardness and roll contact pressures depend somewhat on the nature of the embossed pattern. Where the pattern involves deep detailed valleys a softer surfaced roll 38 may be employed coupled with higher contact pressures. Shallow designs may call for harder surfaced rolls and lighter nip pressures. In a typical embodiment employing a roll having a diameter of 8 inches and a 25 Durometer roll surface hardness gave good results for most types of embossed patterns. Twenty Durometer rolls are acceptable in some cases but tend to wear somewhat too rapidly. On the other hand it is suggested that roll hardness be kept below about 40 Durometer. Optimum nip pressures are arrived at experimentally, i.e., roll pressure is simply increased by way of the adjustment means until it is determined by observation that the desired amount of accent material is being picked up from the ridges and valley side walls of the embossed design. Roll 38 is driven in rotation by suitable drive means (not shown) at a speed related to the speed of movement of the panel so that there is as little as possible relative motion between the roll surface 40 and the embossed panel surface at the line of contact, i.e., there is substantially pure rolling contact between them. This assists in ensuring that there is optimum pick-up of the pigment or accent material by the roll surface. Any significant amount of relative motion between the roll 38 and the panel tends to displace the accent or pigmenting material back into the deeper valleys resulting in excessive pigment thicknesses and possible blistering of the pigment during later curing or drying stages. Furthemore, relative motion may damage the rather delicate paper overlay on the panel.

Figure 5:
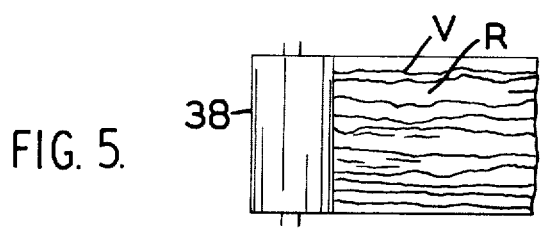
FIG. 5 illustrates the relative orientation of the roll and an embossed pattern.
Figure 6:
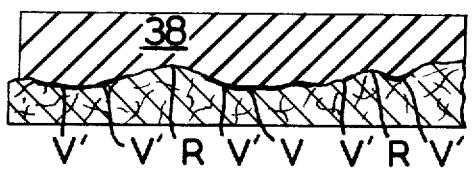
FIG. 6 is a partial cross-sectional view taken along the line of contact of the resilient roll with the panel surface.
Figure 7:
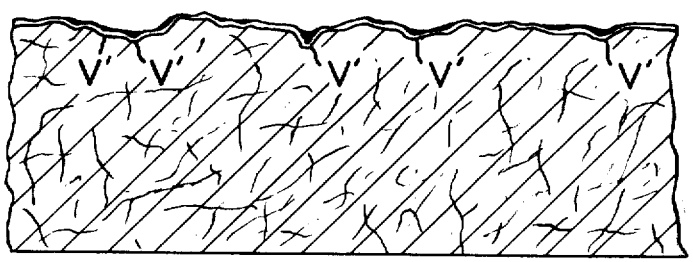
FIG. 7 is a cross-sectional representation of a portion of a panel treated according to the present invention.

FIG. 5 shows the preferred relative orientation of the rotation axis of roll 38 and the primary direction of the valleys V and ridges R in the panel surface. These valleys and ridges, in a wood grain pattern for example, extend generally longitudinally of the panel and generally transversely of the rotation axis of the roll as also does the printed woodgrain pattern on the paper overlay. If one were to view the operation along the line of contact of the roll 38 with the panel, the configuration depicted in FIG. 6 would be seen. Because of the contact pressure between the roll 38 and the panel, the resilient roll surface contacts not only the ridges R but also the side walls and in some cases even the bottoms of the wider shallow valleys. However, in the deeper or more abrupt valleys V' there is no contact between the roll surface and the panel and hence a relatively large amount of the previously applied pigmenting agent will be left in those regions. Since the highest contact pressure occurs at the upper parts of the ridges R virtually all of the accent or pigmenting agent will be removed or picked up therefrom. Along the valley side walls, varying amounts of material are picked up by roll 38, and since the contact pressures vary from the tops of the ridges down into the valleys, there will be corresponding graduations in the amounts of pigmenting material left on the panel surface as illustrated in FIG. 7.

After the panel has passed beneath roll 38, provision is made to at least partially dry or cure the accent or pigment on the panel surface. Thus with reference to FIG. 1, the panel is passed through a high velocity hot dryer which blows air at about 325°F onto the treated surface for a period of time to cure or dry the accent material on the panel surface to a degree sufficient as to prevent removal thereof during application of the clear protective top coat. It is not necessary to fully cure or dry the accent material at this stage as additional heat is required, in any event, to cure the final top coat, which additional heat will also cure or dry the accent material as well.

Figure 8:
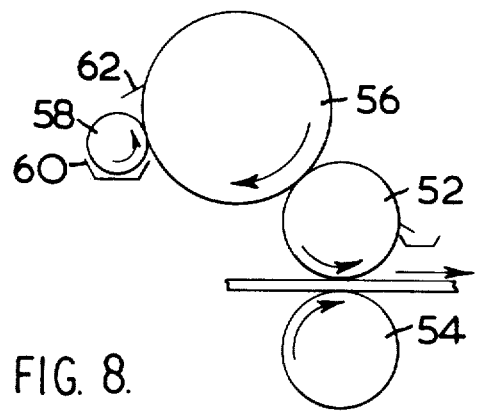
FIG. 8 illustrates apparatus for applying a protective top coat to the panel.

The panel is then conveyed to a topcoat applicator 50 as depicted in FIG. 2 and shown in more detail in FIG. 8. The topcoat applicator is precision roll coater of conventional design and employs a rubber applicator roll 52 for contacting the panel, a back up roll 54 in opposition thereto below the panel, an engraved surface (eg. gravure) transfer roll 56 contacting applicator roll 52, and a topcoat material pickup roll 58 running in a bath 60 of topcoat materials and contacting roll 56. Excess material is doctored off the transfer roll 56 by a doctor blade 62. The object is to provide the panel with a transparent protective coating and accordingly a clear plastics finish compatible with the previously applied accent or pigment material is applied as, for example, an amine modified water based acrylic emulsion, preferably with some catalyst added to speed curing, which emulsion contains no pigmenting agents. The average film thickness will usually be in the order of 0.3 mils. The exact type of topcoat applicator used is not critical and, if desired, the clear topcoat may be sprayed on.

After the top coat application, the panel is then passed through banks of high velocity hot air dryers to completely dry and cure both the pigmented accent material and the clear protective top coat. Temperatures as high as 600°F may be reached during the final curing stage with both temperature and time being dependent on the exact make-up or composition of the accent and topcoat materials.

The final accented product will thus have a greatly improved appearance due to several factors. In the more pronounced valleys and recesses relatively large amounts of pigment remain while little or no pigment remains on the higher ridges. Between these two extremes, varying amounts of pigment remain. Thus, the embossed pattern stands out clearly and the apparent depth of pattern is greater as compared with non-accented prior art products. Furthermore, since little or no pigment remains on the higher ridges, the underlying printed surface of the paper shows through. Thus, assuming that the paper has been printed with several muted shades, the final product will exhibit colour variations on the higher ridges which, in combination with the varying amounts of accent pigment on the lower surface portions, will provide a very pleasing overall effect assuming that the printed colours on the paper and the accent colour are selected to complement one another.

We claim:

1. A method of producing a distinctive pattern on a panel comprising passing a panel in a path of travel, the panel having a multi-level surface pattern of pronounced ridges and walled recesses or valleys, applying a liquid coating of coloring material over said surface, and thereafter removing at least some of said liquid material from at least the higher ones of the ridges and portions of the walls of the recesses or valleys by transferring the liquid material onto a non-absorbent resiliently deformable surface of a rotating roll, said transferring of the liquid material including effecting pressurized contact between the resiliently deformable roll surface and the moving panel surface with the surface speed and direction of rotation of the roll being so related to the speed and direction respectively of the panel surface as to avoid substantial relative motion at the regions of contact therebetween whereby to avoid substantial displacement of the liquid material into said recesses or valleys, continually removing from the roll surface the liquid material which has been transferred thereto from the panel surface so that the roll continually presents a substantially clear surface to the coated panel surface, and thereafter, effecting drying or curing of the liquid material remaining on the panel.

2. The method of claim 1 further including applying a transparent top coat over the panel surface after said liquid material has been at least partially cured.

3. A method of treating a panel having a multi-level pattern of ridges and recesses on a major surface thereof comprising passing the panel in a path of travel, coating said patterned major surface with a liquid coloring material and thereafter transferring at least some of said liquid material from at least the higher portions of the pattern onto a non-absorbent resiliently deformable surface of a rotating roll by rollingly contacting said coated major surface under pressure with the resiliently deformable surface of the roll such that said roll surface resiliently deforms under the influence of the contact pressures and contacts at least the higher portions of the patterned surface and thus picks up and removes liquid material from said higher portions, the speed of rotation of the roll and the rate of movement of the panel being so related so as to avoid substantial relative motion between the roll surface and the panel surface at the areas of contact therebetween thereby to avoid substantial displacement of said liquid material back into said recesses, and continually removing from the roll surface the liquid material which has been picked up by the roll so that the roll continually presents a substantially clean surface to the coated panel surface, and thereafter at least partially drying or curing the liquid material which remains on said surface of the panel.

4. A method of decorating a panel having a major surface comprising a base and a paper layer thereon presenting an outer surface having a multi-level pattern of ridges and recesses, said method comprising passing a panel in a path of travel, applying a liquid coating of a coloring material over said outer surface, and thereafter removing at least some of said liquid material from at least the higher portions of the pattern by transferring the liquid material thereon to a non-absorbent resiliently deformable surface of a rotating roll, said transferring of liquid material including effecting pressurized contact between the rotating roll and the moving outer surface with there being substantially no relative movement between the roll surface and said outer surface at the regions of contact therebetween thus to avoid substantial displacement of the liquid material back into said recesses, continually removing from the roll surface the liquid material which has been transferred thereto from the outer surface so that the roll continually presents a substantially clean surface to the coated outer surface and thereafter, effecting drying or curing of the liquid material remaining on the panel.

5. The method of claim 4 wherein said outer surface of said paper has a printed pattern on said paper complementary to the multi-level surface pattern on said panel surface with said roll removing sufficient liquid material from at least the higher ones of the ridges as to expose to view the printed surface on the paper on at least the higher ones of the ridges.

6. A method of decorating a panel, said panel comprising a base and a layer of paper integrally combined with a surface of the base and in which the paper covered surface of the panel has a multi-level pattern of ridges and recesses thereon, said paper layer intimately conforming with said multi-level pattern to present a patterned outer major paper surface having ridges and recesses thereon, said method comprising passing the panel in a path of travel, coating said patterned major surface with a liquid coloring material and thereafter transferring at least some of said liquid material from at least the higher portions of the patterned major surface onto a non-absorbent resiliently deformable surface of a rotating roll by contacting said coated major surface under pressure with the resiliently deformable surface of the roll, the speed and direction of rotation of the roll being so related to the speed and direction of movement of the panel as to avoid substantial relative motion at the regions of contact therebetween whereby to avoid substantial displacement of said liquid material back into said recesses, and continually removing from the roll surface the liquid material which has been transferred thereto so that the roll continually presents a substantially clean surface to the coated outer surface, and thereafter at least partially drying or curing the liquid material which remains on said major surface of the panel.

7. The method of claim 6 further including the subsequent step of applying a non-pigmented, transparent protective coating to said major surface of the panel and drying or curing the protective coating.

8. The method of claim 6 wherein said outer surface of the layer of paper is printed, and the degree of pressure between the roll surface and the panel and the roll surface hardness is such as to provide for the removal of sufficient liquid material from the at least higher portions of the patterned major surface as to expose to view the printed paper surface on at least the higher portions.

* * * * *